(12) United States Patent
Deliwala et al.

(10) Patent No.: US 11,869,030 B1
(45) Date of Patent: Jan. 9, 2024

(54) SYSTEMS AND METHODS FOR ELECTRONIC PAYMENT USING LOYALTY REWARDS

(71) Applicant: American Express Travel Related Services Company, Inc., New York, NY (US)

(72) Inventors: Manish K. Deliwala, Chandler, AZ (US); Rajesh K. Namboodiri, Phoenix, AZ (US); Keshav A. Narsipur, Chandler, AZ (US); Huei Ong, New York, NY (US); Tony Prentice, New York, NY (US); Lisa C. Yokoyama, New York, NY (US); Santhosh R. Rao, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 100 days.

(21) Appl. No.: 16/698,054

(22) Filed: Nov. 27, 2019

Related U.S. Application Data

(63) Continuation of application No. 15/287,457, filed on Oct. 6, 2016, now abandoned.

(51) Int. Cl.
*G06Q 30/0226* (2023.01)
*G06Q 20/38* (2012.01)
*G06Q 20/36* (2012.01)

(52) U.S. Cl.
CPC ....... *G06Q 30/0226* (2013.01); *G06Q 20/367* (2013.01); *G06Q 20/385* (2013.01); *G06Q 20/387* (2013.01)

(58) Field of Classification Search
None
See application file for complete search history.

(56) References Cited

U.S. PATENT DOCUMENTS

| | | | | |
|---|---|---|---|---|
| 2013/0073459 A1* | 3/2013 | Zacarias | ................ | G06Q 30/08 705/41 |
| 2013/0325579 A1* | 12/2013 | Salmon | .............. | G06Q 30/0228 705/14.29 |
| 2014/0344153 A1* | 11/2014 | Raj | ..................... | G06Q 20/3821 705/44 |
| 2015/0254647 A1* | 9/2015 | Bondesen | ............ | G06Q 20/385 705/41 |
| 2015/0254699 A1 | 9/2015 | Bondesen et al. | | |

(Continued)

*Primary Examiner* — Chrystina E Zelaskiewicz
(74) *Attorney, Agent, or Firm* — Thomas | Horstemeyer, LLP

(57) ABSTRACT

A system for using loyalty rewards accounts in a digital wallet may generate a mapping comprising an account mapped to a wallet token number and an indicator with the mapping stored in a database on a network of servers. The indicator may indicate an account type, and the wallet token number may be transmitted to a user device. The system may also receive a transaction request including a received wallet token number and a received indicator The indicator may be matched to the received indicator to determine the received wallet token number is associated with the account type (e.g., a loyalty rewards account). The system may route the transaction request to a loyalty settlement process in response to the account type being a loyalty rewards account.

21 Claims, 5 Drawing Sheets

(56) References Cited

U.S. PATENT DOCUMENTS

| | | | |
|---|---|---|---|
| 2016/0092869 A1* | 3/2016 | Salama | G06Q 20/326 |
| | | | 705/41 |
| 2016/0125458 A1 | 5/2016 | Enriquez et al. | |
| 2016/0140541 A1 | 5/2016 | Pearson et al. | |
| 2016/0232566 A1* | 8/2016 | Bonalle | G06Q 20/405 |
| 2017/0364918 A1* | 12/2017 | Malhotra | G06Q 20/023 |
| 2018/0089669 A1* | 3/2018 | Singh | G06Q 20/385 |

* cited by examiner

SYSTEMS AND METHODS FOR ELECTRONIC PAYMENT USING LOYALTY REWARDS

CROSS-REFERENCE TO RELATED APPLICATION

This application is a continuation of copending U.S. patent application Ser. No. 15/287,457, entitled "SYSTEMS AND METHODS FOR ELECTRONIC PAYMENT USING LOYALTY REWARDS" and filed on Oct. 6, 2016, which is incorporated by reference as if set forth herein in its entirety.

FIELD

The present disclosure relates to loyalty account mapping and routing for digital wallets.

BACKGROUND

Digital wallets streamline the payment protocol for purchases both online and in store. As more users acquire digital devices, the availability of digital wallet applications increases. Digital wallet management, however, can be unwieldy. Users may be prompted to provide account information, but the account information alone may not be enough to securely add the account to a digital wallet. Users may further have an authorization telephone call with an account issuer to validate the user's digital wallet request. Security steps such as authorization phone calls may seem unnecessary to many users and thereby prevent the user from using the available digital wallet services.

Furthermore, account-issuing banks typically do not support digital wallet transactions using loyalty points. Despite going through the authentication to add a funding account to the digital wallet, loyalty points may be unavailable for payment.

Many account-issuing banks provide their members with servicing applications. Servicing applications typically provide users with access to their own sensitive information and the ability to perform some transactions. As such, the servicing applications may authenticate users with the issuing bank. Although the user is authenticated, the servicing applications may not offer the ability to add an account serviced by the issuing bank to the user's digital wallet. In particular, servicing applications typically do not support the addition of loyalty rewards accounts to a user's digital wallet.

SUMMARY

A system, method, and computer readable medium (collectively, the "system") is disclosed for managing and using loyalty rewards accounts in a digital wallet. The system may also serve as an ad hoc capability triggered by transactions linked to a payment card. The system may generate a mapping comprising an account mapped to a wallet token number and an indicator with the mapping stored in a database on a network of servers. The indicator may indicate an account type, and the wallet token number may be transmitted to a user device. The system may also receive a transaction request including a received wallet token number and a received indicator. The indicator may be matched to the received indicator to determine the received wallet token number is associated with the account type (e.g., a loyalty rewards account). The system may route the transaction request to a loyalty settlement process in response to the account type being a loyalty rewards account.

In various embodiments, the mapping may include an alias associated with the account and the wallet token number. The alias may also have the structure of an account number. The mapping may also comprise a funding source associated with the alias. The transaction request may be routed to a standard settlement process in response to the loyalty rewards account having insufficient points to complete the transaction request. The transaction request may also be routed to a standard settlement process in response to the loyalty rewards account having sufficient points to partially complete the transaction request. An update may be pushed to a digital wallet running on the user device in response to a change in the loyalty rewards account.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
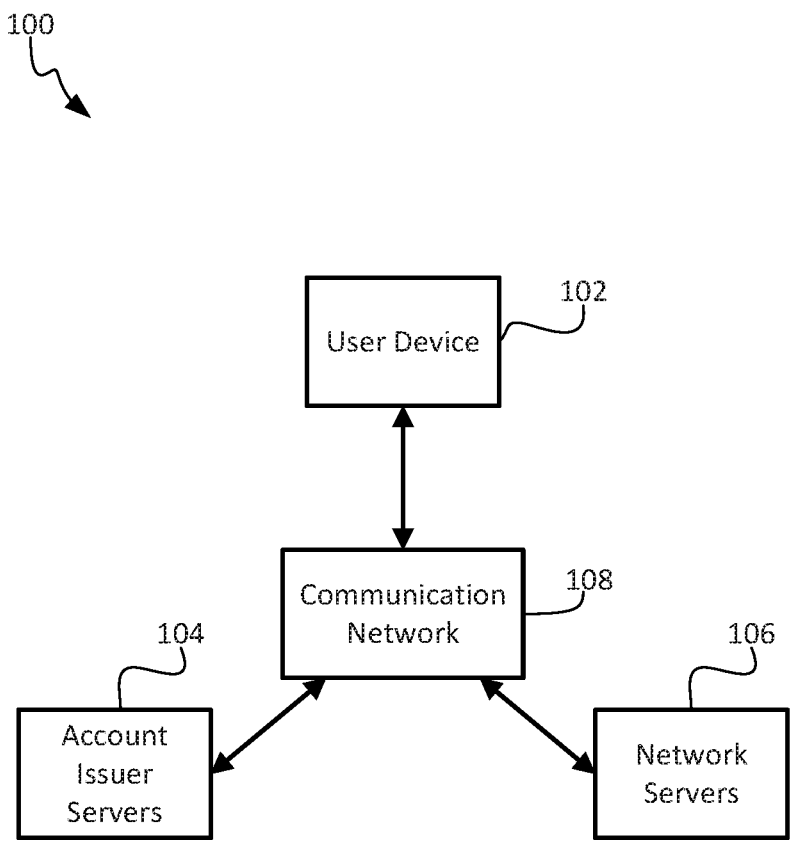
FIG. 1 illustrates an exemplary system for management and use of loyalty payment accounts in digital wallets, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The phrases consumer, customer, user, transaction account holder, card member or the like may include any person, entity, business, government organization, business, software, hardware, machine associated with a transaction account that buys merchant offerings offered by one or more merchants using the account and/or who is legally designated for performing transactions on the account, regardless of whether a physical card is associated with the account. For example, the card member may include a transaction account owner, a transaction account user, an account affiliate, a child account user, a subsidiary account user, a beneficiary of an account, a custodian of an account, and/or any other person or entity affiliated or associated with a transaction account.

As used herein, a "digital wallet" includes a software and/or electronic device that facilitates individual e-commerce and m-commerce transactions. The digital wallet may operate by aggregating the transaction account holder's payment and billing information and serving as the merchant of record, and/or passing through the transaction account holder's payment and billing information to the end merchant Examples of digital wallets currently available may include Apple Pay®, Passbook®, and Google Wallet™.

The present disclosure provides a system, method, and computer program product for managing and using loyalty pay accounts in conjunction with a digital wallet via a separate account issuer application. The account issuer application may map and route account data securely to the digital wallet on various digital devices. In that regard, the account issuer may enable a user to add a loyalty payment account to the digital wallet as a payment medium. The loyalty account may be added to the digital wallet as a token, identified as a loyalty/rewards token, that may optionally be linked to a funding source. A third party application provided by the account issuer may be used an alternative to the digital wallet application itself to add the loyalty payment accounts. The use of loyalty pay accounts as disclosed herein may expand digital wallet functionality in a secure manner. The provisioning of loyalty accounts on user devices enhances the user experience by making points available for everyday transactions, making points usable at any merchant that accepts digital wallet payments in-store or in-app, and tracking point activity and balances in real-time.

With reference to FIG. 1, system 1X) for digital wallet management is shown, in accordance with various embodiments. System 100 may comprise a user device 102. User device 102 may comprise any device capable of receiving and displaying an electronic message via network 108. For example, user device 102 may take the form of a computer or processor, or a set of computers/processors, although other types of computing units or systems may be used, including laptops, notebooks, hand held computers, personal digital assistants, cellular phones, smart phones (e.g., iPhone®, BlackBerey®, Android®, etc.) tablets, wearables (e.g., smart watches and smart glasses), or any other device capable of receiving data over network 108. User device 102 may communicate over network 108 with issuer server 104.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec. SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1917) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal. Schorr signature, DSA, PGP, PKI, GPG (GnuPG), and symmetric and asymmetric cryptosystems.

In various embodiments, user device 102 may interact with issuer server 1104 to provide backend functionality for an application operating on user device 102. The application operating on user device 102 may be a transaction account application operating with issuer server 104 where the issuer is the transaction account issuer. A user may use the issuer application to access information regarding their accounts and to use their accounts to make electronic transactions and/or manage a digital wallet. The transaction account application may be a native application running on user device 102 to service transaction account holders for accounts issued by the issuer. The transaction account application may be referred to herein as a "bank app" or "issuer app," and issuer server 104 may be referred to as a "bank server." Issuer server 104 may provide transaction account information and user information to user device 102 for use in the transaction account application. The issuer server 104 may also be referred to herein as "transaction account issuer server 104." For example, issuer server 104 may be a server maintained by an issuer to provide transaction account numbers for transaction accounts issued by the issuer. Issuer server 104 may also communicate over network 108 with network server 106.

In various embodiments, network server 106 may be an enterprise digital wallet hub for managing the issuance and life cycle of tokens on smart devices. Network server 106 may provide alias information for mapping and routing of standard funding accounts as well as loyalty rewards accounts as well as issuer signature validation, which are both described in greater detail below. Network server 106 may include a single computer or a distributed cluster of computers operating in concert to provide the functionality described herein.

Figure 2:
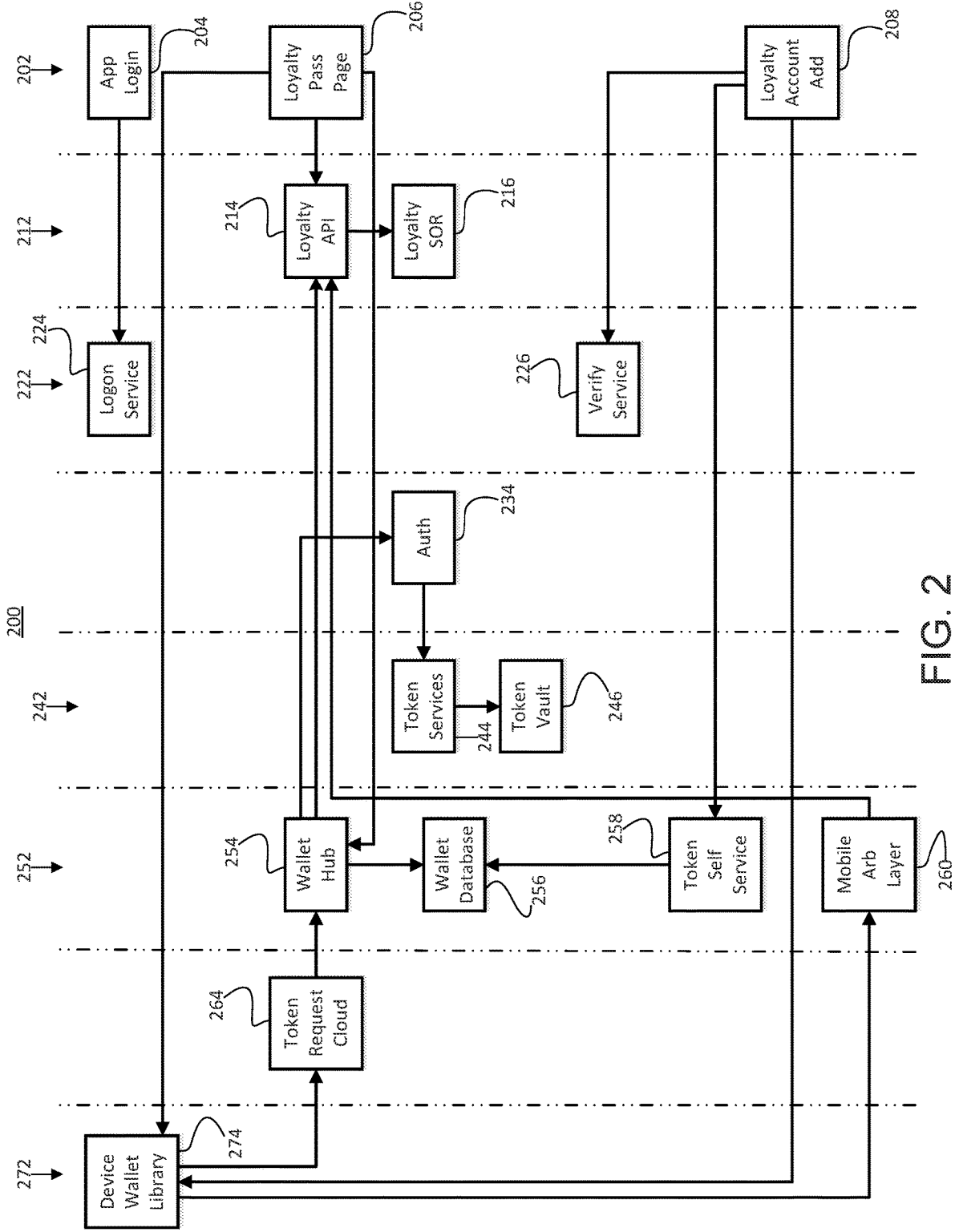
FIG. 2 illustrates an exemplary system architecture for management and use of loyalty payment accounts in digital wallets, in accordance with vanous embodiments.

With reference to FIG. 2, exemplary system architecture 200 for management and use of loyalty payment accounts in digital wallets is shown, in accordance with various embodiments. System architecture 200 may include various software services and applications running on the computing device of system 100 and communicating over network 108.

System architecture 200 may include an issuer application 202 running on user device 102. Issuer application 202 may provide a user with access to their account information and various services offered by the account issuer. Issuer application 202 may include an app login interface 214. A user may browse to the login interface and submit their credentials for authentication to logon service 224.

In various embodiments, logon service 224 may be a software service supported by the loyalty issuer's security services 222 (e.g., running on network servers 106). Logon service 224 may be operated and maintained by an account issuer. By using an issuer application to manage the addition of accounts to the digital wallet, the issuer may provide loyalty account services while the wallet providers remain agnostic to which type of account (e.g., loyalty rewards, credit, checking) is being processed. The issuer application may prompt the user for validation input such as, for example, a dynamic password, a movement, a text password, a security code, a social security number or portion thereof, and/or biometric information. A dynamic password may be a numeric or alphanumeric code delivered to the user for entry into the issuer app. Once the user is authenticated, the issuer application may provide access to sensitive tools such as account information, account management, and adding accounts to a digital wallet.

Figure 3:
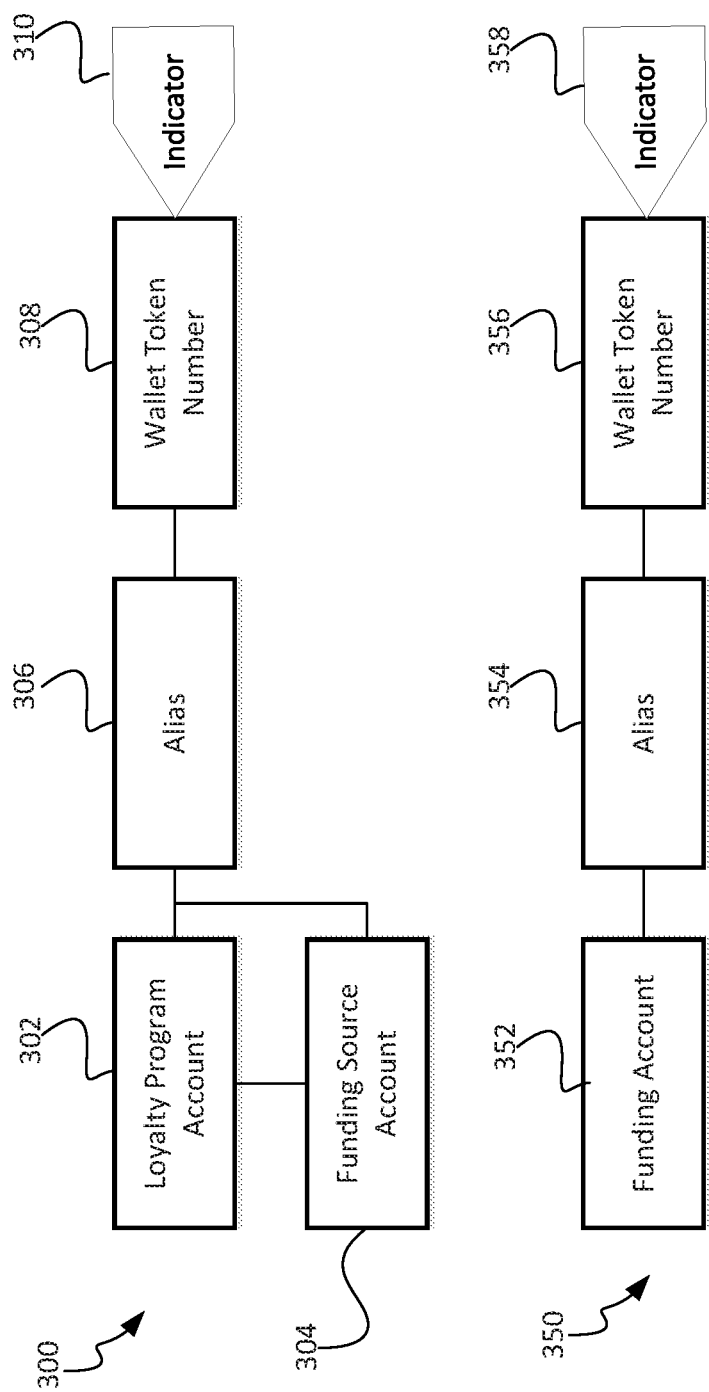
FIG. 3 illustrates an exemplary mapping of loyalty payment accounts and standard funding accounts to aliases, in accordance with various embodiments.

In response to a user navigating to the loyalty pass page 206, user device 102 may contact wallet hub 254 maintained in the token service provider cloud 252 to determine whether the loyalty account is already provisioned (e.g., already has a token). The token may be stored and mapped in the wallet database 256 as illustrated in FIG. 3 below. The token may also include an alias and an indicator to flag the account as a loyalty account rather than a credit or banking account during routing and mapping. Downstream applications such as a payment authorization system may use the indicator to detect loyalty accounts and call on the appropriate loyalty platform functionality to use loyalty points for a particular transaction. A merchant accepting payment may complete loyalty transactions without knowingly accepting the loyalty account and without on-site changes to hardware versus typical digital wallet transactions.

In various embodiments, device wallet library 274 may call wallet hub 254 through the token requestor cloud 264 to add the loyalty pass token. Token requestor cloud 264 may operate on network servers 106 and wallet hub 254. The token for a loyalty account may be activated in authorization systems 234 (e.g., running on network servers 106) in response to successful fraud scoring by wallet hub 254. In response to wallet hub 254 detecting a high probability of fraud token provisioning for the loyalty account may be abandoned. Token vault 242 may provide token services 244 for use in authorization. Active tokens may be stored in token vault 246 in a format described in greater detail below.

User device 102 and/or issuer server 104 may query the network server 106 to retrieve an account identifier such as an account alias and/or other suitable identifiers for an account. The account alias may be mapped to an account number and may be, for example, an FPANID, token reference ID, or other identifier. An account number may be a loyalty account number or a funding account number (e.g., the 15 or 16 digit account number on the front of a credit card or charge card), for example, identifying the issuing bank and the associated loyalty rewards account.

Terms and phrases similar to "associate" and/or "associating" may include tagging, flagging, correlating, using a look-up table or any other method or system for indicating or creating a relationship between elements, such as, for example, (i) a transaction account and (ii) an alias or digital wallet token. Moreover, the associating may occur at any point, in response to any suitable action, event, or period of time.

In various embodiments, an alias may be used to avoid sending the loyalty account number over a network and reduce the footprint in case of a security breach. The alias may include an issuing bank ID and a loyalty reference ID number that is mapped to identify the loyalty rewards account. The alias may meet all the rules for a transaction account number (e.g., a credit card number), such as including an issuing bank ID of the specified length, a transaction account number of the specified length, and/or a check digit as appropriate in that regard, the alias may have the form and structure of a valid transaction account number (i.e., pass a structure checking algorithm) and behave like a valid transaction account number when used in interfaces (e.g., web applications and web sites) that check the structure of the account number. The network server 106 may be able to convert the alias into the loyalty account number as well as convert the loyalty account number into the alias. In that regard, the loyalty account alias may be indistinguishable from an alias of a credit or banking account funding source alias for use in a digital wallet.

In various embodiments, an alias may also comprise a string containing non-numeric values. The string may be created using an algorithm kept secret on network server 106. In that regard, the alias may comprise a string of characters mapped to the transaction account number. The alias comprising non-numeric characters that are mapped (and without following transaction account number structure) may not be compatible with some web applications or web sites that require a transaction account number that passes a validation test.

In various embodiments, the issuer server 104 may receive an alias from the network server 106. The alias may be newly generated or a previously generated alias. Communication between network server 106 and issuer server 104 may be facilitated using a normalized API. The API may specify the available functionality for interacting with network server 106 and requirements for using that functionality. The API may be made available to the account issuer for use in creating an issuer app and/or issuer server 104 that interacts with the network server 106. In that regard, more than one issuer app and issuer server 104 maintained by multiple account issuers may interact with network server 106. The API may enable the use of aliases mapped to loyalty account numbers and/or standard transaction account numbers rather than account numbers themselves.

In various embodiments, the issuer application may query user device 102 to request a list of accounts (loyalty accounts, credit accounts, bank accounts, etc.) already present in the digital wallet, if any. The issuer application may then check if a particular loyalty account is in a digital wallet. The issuer application may interact with the digital wallet and/or user device 102 using another API provided to facilitate interaction with the digital wallet or user device 102. The issuer application may also display an add interface and/or button for an account not in the digital wallet. A user may then use the add interface displayed on user device 102 to select add an account to wallet.

In various embodiments, in response to a user interacting with the account add interface 208 of an issuer application running on user device 102 to add a loyalty account to the digital wallet, also running on user device 102. User device 102 may thus add a loyalty account to a digital wallet by linking the loyalty account with a token. The token may also link the loyalty account to a funding card (e.g., a credit card or a back-up payment product). Each token added may have a loyalty program attribute or flag set to identify the account as a loyalty account as opposed to other types of funding sources, as described in greater detail below.

In response to a request to add a loyalty account, user device 102 may contact a verification service 226 running on issuer servers 104. Verification service may verify validation information such as a card security code, one time password, and other user authentication information. User device 102 may also contact a token self-service component 258 running on token service provider cloud 252 (e.g., network servers 106) to support tokenized transactions. Token self-service component 258 may manage the lifecycle management activities from the loyalty account such as suspending the loyalty token in response to cancellation or suspension of the loyalty account.

The issuer app running on user device 102 may also use device wallet library 274, which is available as a device application programing interface (API) 272 available to user device 102 to communicate with a wallet provider operating network servers 106. The various computing devices of system 100 may communicate electronically over network 108 using, for example, an API. An API may be a set of functions and protocols provided to application developers for interfacing with issuer server 104 and/or network servers 106 by passing and receiving predetermined arguments and parameters. In that regard, issuer application may be developed using an API to communicate with a wallet provider and enable the addition of loyalty accounts to a digital wallet. For example, issuer application running on user device 102 may make API calls to network server 106 to add and/or manage a loyalty account in the digital wallet. The API may be used to register the user device for push notifications, for example.

In various embodiments, device wallet library 272 may thus communicate with mobile arbitration layer 260 running on network servers 106 to register user device 102 for push notifications relating to the loyalty account. Push notifications may be generated by network servers 106 in response to changes in a loyalty rewards account such as, for example, point balance changes, point conversion rate changes, rewards offers, or other changes associated with the loyalty rewards account. The user may thus view loyalty point balances, dollar totals, loyalty activities and events, and point transaction activity. In response to a transaction is made by the loyalty account, view fields may, be updated to reflect the most recent device activity. Additionally, if the user points balance changes due to other events not associated with the mobile wallet card, the points balance total may be updated as well. On the "card" construct in the digital wallet, a customized message can also be automatically displayed to the user that is associated to the loyalty program (i.e.; Informing the user that their points doubled for the last transaction because of a special offer). The loyalty program's token thus allows the ability to directly pull and display in real-time the up-to-date balance and other account information. The user may also be notified via a communication channel such as email for major events triggered by the loyalty account such as, for example, when the account is added, deleted, suspended, resumed, a transaction as a certain threshold amount, when a loyalty transaction fails, or any other key changes to their loyalty account tokenized in their digital wallet.

In various embodiments, mobile arbitration layer 260 may also communicate with issuer servers 104 using loyalty API 214 supported by loyalty eco systems 212 (e.g., running on network servers 106) to access data stored in system of record (SOR) 216. SOR 216 may be a data structure such as, for example, a relational database configured to store loyalty point data and loyalty point account information. SOR 216 may be the primary system from which loyalty points are deducted in response to purchases made with loyalty rewards accounts. Mobile arbitration layer may thus provide up-to-date point account information such as point balances, point offers, and point conversion rates for review on user device 102.

In various embodiments, the loyalty account in the digital wallet may be suspended in response to the point balance reaching a floor limit. The loyalty accounts may be tokenized on user device 102. The token may include an alias or other identifier of the loyalty account that is mapped by network server 106 to the loyalty account. If the funding card or the digital wallet program status changes, the mobile wallet card status may also be impacted (i.e., the digital wallet token would be deleted in response to the user canceling their loyalty program). The status of this token may be proactively synced and can be impacted due to the loyalty program changes, the points balance, and or the funding card.

With reference to FIG. 3, mappings for various accounts in a digital wallet are shown, in accordance with various embodiments. Mapping 300 illustrates a mapping for a loyalty program account. Loyalty program account 302 may be mapped to an alias 306. Alias 306 may be any suitable alias, as described above. Alias 306 may thus be passed between devices and the more sensitive loyalty program account 302 may be looked up by accessing a database table using the alias as a key.

In various embodiments, a funding source account 304 may also be associated with the loyalty program and/or the alias. The funding source account number may be, for example, a 15 or 16 digit account number as commonly printed on the front of a credit card or charge card. The funding source account 304 may be used for purchases when the loyalty program account associated with the loyalty program account 302 has insufficient points to complete a transaction. The funding source may also be detected first, with points deducted in light of a reduced transaction amount. In that regard, a user may pay in full with points, split payment between the funding source and points, authorize but don't settle, and/or authorize, settle, reconcile with a credit.

The funding source account may thus be used to complete a balance of the transaction in response to the loyalty program account 302 having sufficient points to partially fund the transaction. Alias 306 may be associated with a wallet token number 308 and an indicator 310. The wallet token number 308 may identify the token generated for storage on a user device 102. Wallet token number 308 may be used to push account notifications to the wallet for the loyalty program account. The indicator may be a flag set to indicate that a loyalty program account 302 is associated with the alias. During processing, the indicator 310 may be checked to determine whether to route the transaction through typical authorization systems or through loyalty authorization systems, as described in greater detail below.

Mapping 350 illustrates a mapping for a funding account 352 such as, for example, a credit account or a bank account.

Funding account 352 may be mapped to an alias 354. Alias 354 may be any suitable alias, as described above, and may be similar to alias 306 of mapping 300. Alias 354 may thus be passed between devices and the more sensitive funding account 352 may be looked up by accessing a database table using the alias as a key.

In various embodiments, alias 354 may be associated with a wallet token number 356 and indicator 358, similar to those of mapping 3X). The indicator 358 of mapping 350 may indicate that the associated account is a funding account rather than a loyalty program account. Transactions having an indicator 358 signaling a funding account 352 may be routed through standard authorization systems. Indicator 358 and indicator 310 are thus flags that may be set to indicate the type of account that is mapped to a wallet token number and/or an alias. Mapping 350 and mapping 30) may be used to store account information and aliases for different types of accounts in the same data structure for retrieval and usage.

Figure 4:
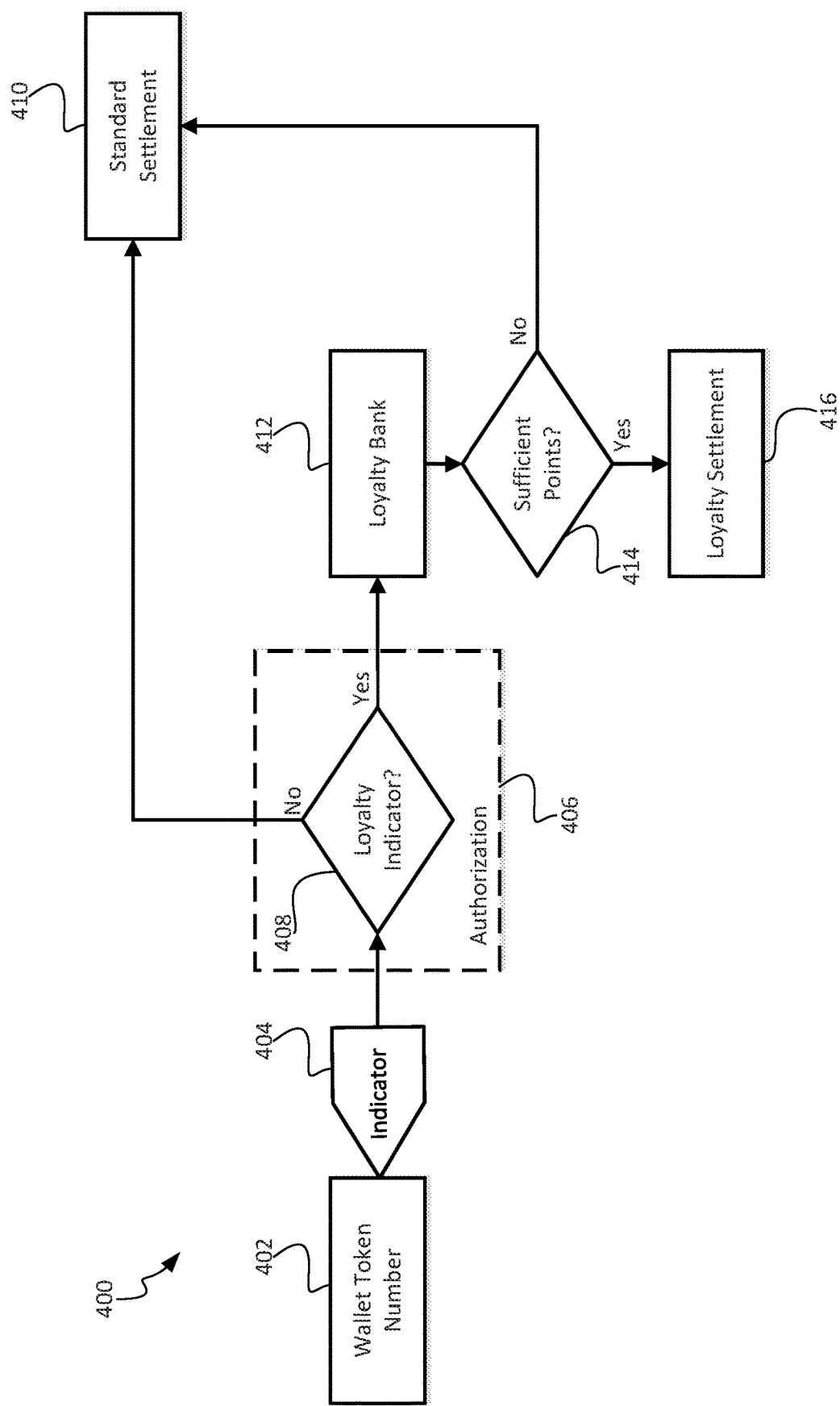
FIG. 4 illustrates an exemplary process for processing payments using a digital wallet with standard funding accounts and loyalty payment accounts, in accordance with various embodiments.

With reference to FIG. 4, a process 400 for processing transactions is shown, in accordance with various embodiments. Process 400 may be executed on authorization systems 234 and/or network servers 106. Process 400 may be used to authorize digital wallet transactions using funding source accounts and/or loyalty rewards accounts. Wallet token number 402 and indicator 404 may be received for authorization 406 over network 108 by authorization systems 234 and/or network servers 106.

In various embodiments, indicator 404 may be checked to determine whether wallet token number 402 is associated with a funding account, a loyalty account, or another type of transaction account. Authorization systems 234 may route the transaction based on indicator 404. In response to indicator 404 indicating a loyalty program account is associated with the wallet token number 412, the transaction information and account information may be transmitted to the loyalty bank 412 for completion. In response to indicator 404 indicating a typical funding account, the transaction may be routed to standard settlement 410.

In various embodiments, the loyalty bank may check the point account balance of the loyalty program account associated with wallet token number 402. If sufficient loyalty points are available in the loyalty rewards account to complete the transaction, then the transaction may be sent to loyalty settlement 416. If insufficient points are available in the loyalty rewards account to complete the transaction, then the transaction may be sent to standard settlement 410.

Figure 5:
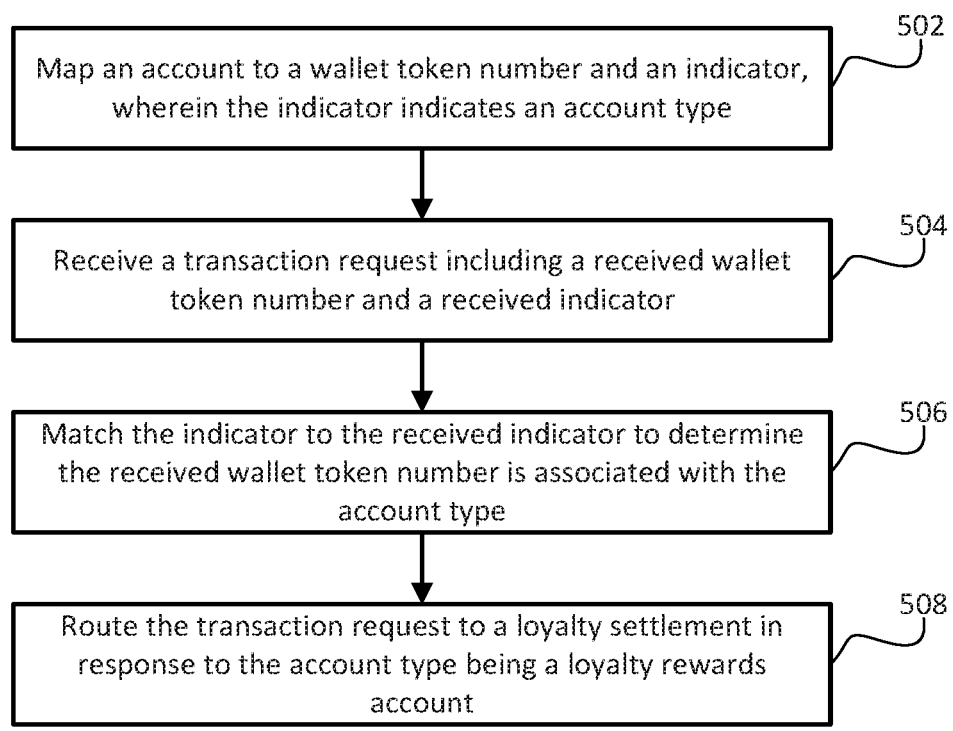
FIG. 5 illustrates an exemplary process for completing digital wallet transactions using tokenized loyalty rewards accounts, in accordance with various embodiments.

With reference to FIG. 5, an exemplary process 500 for completing a transaction on system 100 and/or system architecture 200 using a tokenized loyalty rewards account is shown, in accordance with various embodiments. The process may include generating, by a network of servers (i.e., issuer servers 104 and/or network servers 106) a mapping (Block 502). The mapping may be similar to mapping 300 and/or mapping 350 as described with reference to FIG. 3 above. The mapping may thus comprise an account mapped to a wallet token number, and alias, and/or an indicator. The mapping stored in a database on the network of servers such as token vault 246 or wallet database 256 of FIG. 2. The indicator indicates an account type (e.g., a loyalty rewards account, a credit account, or a bank account as described above). The wallet token and number may be transmitted to a user device for storage and later use to complete purchase transactions using a loyalty rewards account.

In various embodiments, the system may receive a transaction request (Block 504). The transaction request may include a wallet token number and an indicator, as described above. The received indicator may be matched to the known indicator values to determine the wallet token number is associated with a type of account (Block 506). For example, known indicator values may include a credit account flag, a loyalty rewards account flag, and bank account flag. Valid values for the indicator may include any known flag or a default value. The network of servers may route the transaction request to a loyalty settlement process in response to the account type being a loyalty rewards account (Block 508).

A user may thus be able to use a loyalty account from the digital wallet on their user device 102 to make a payment using loyalty points. The user can actively select the loyalty card to pay at time of checkout at any merchant that accepts mobile wallet payments in a similar manner to how payment accounts are typically selected. The loyalty rewards account may be configured to look like a standard payment account in the digital wallet.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information, generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface, constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a, second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker, flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated, in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments". "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor, and a plurality of databases. Various databases used herein may include: client data; merchant data, financial institution data and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, wiiich are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

The computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPILORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server such as a digital wallet hub. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LNUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® OS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein. "data" may include encompassing information such as commands, queries, files, data for storage, and the like in digital or any other form.

Any databases discussed herein may include relational, hierarchical, graphical, or object-oriented structure and/or any other database configurations. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington). MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets mar be stored using any suitable technique, including, for example, storing individual files using an ISO/IEC 7816-4 file structure, implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816.6 data elements, stored as ungrouped data elements encoded using ISO/IEC Abstract Syntax Notation (ASN.1) as in ISO/AEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML, documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.192.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C. C++, C#, JAVA®, JAVASCRIPT, VBScript. Macromedia Cold Fusion, COBOL, MICROSOFT® Active Server Pages, assembly, PERL. PHP, awk, Python, Visual Basic, SQL Stored Procedures. PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references. (1) "Applied Cryptography: Protocols. Algorithms, And Source Code In C." by Bruce Schneier, published by John Wiley & Sons (second edition, 1995); (2) "JAVA® Cryptography" by Jonathan Knudson, published by O'Reilly & Associates (1998); (3) "Cryptography & Network Security. Principles & Practice" by William Stallings, published by Prentice H-all all of which are hereby incorporated by reference.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

Phrases and terms similar to "transaction account" may include any account that may be used to facilitate a financial transaction. Phrases and terms similar to "financial institution" or "account issuer" may include any entity that offers transaction account services. Although often referred to as a "financial institution." the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B. and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment, for example, A and B. A and C. B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system, comprising:
a client device comprising a processor, a memory, and a display; and
machine-readable instructions stored in the memory that, when executed by the client device, cause the client device to at least:
add a loyalty rewards account as a payment medium to a digital wallet application by transmitting a token that identifies the loyalty rewards account to the digital wallet application, wherein the token includes an alias account identifier that is mapped to the loyalty rewards account, wherein the alias account identifier includes an issuing bank identifier or a loyalty reference identifier number, wherein the alias of the loyalty rewards account is associated with a funding source account, wherein the funding source account is available for settling purchases via a standard credit or banking account settlement process when the loyalty rewards account has insufficient reward points to settle a particular transaction via a loyalty settlement process;
render a first card construct within a user interface of the digital wallet application, the user interface being rendered on the display of the client device and the first card construct containing a view field that displays a status of the loyalty rewards account represented by the first card construct;

send a request to receive notifications regarding the loyalty rewards account to a computing device, the request comprising the token that identifies the loyalty rewards account;

receive a real-time notification from the computing device, the real-time notification indicating a change in the status of the loyalty rewards account;

update the view field within the first card construct rendered on the display to reflect in real-time the change in the status of the loyalty rewards account by causing the client device to at least:

display a second card construct within the user interface;

monitor boundaries of the first card construct and the second card construct to detect an overlap condition where the second card construct overlaps the first card construct such that the status of the loyalty rewards account, when rendered in a first format in the first card construct, is obscured from a view of a user;

determine the status of the loyalty rewards account would not be completely viewable if relocated to an unobstructed portion of the first card construct;

calculate a first measure of an area of the first card construct and a second measure of the area of the unobstructed portion of the first card construct;

calculate a scaling factor which is proportional to a difference between the first measure and the second measure;

scale the status of the loyalty rewards account based upon the scaling factor;

automatically relocate the scaled status of the loyalty rewards account to an unobscured portion of the first card construct in a second format during the overlap condition so that scaled status textual information is viewable on the display by the user; and automatically return the relocated scaled status textual information to the first format within the first card construct when the overlap condition no longer exists;

receive a selection of the first card construct representing the loyalty rewards account for payment of a transaction at a checkout of a merchant that accepts mobile wallet payments; and transmit a transaction request for the transaction, wherein the transaction request includes the token that identifies the loyalty rewards account as the payment medium for the transaction, wherein the token further includes an indicator that specifies an account type for the loyalty rewards account and is configured for routing the transaction request to the loyalty settlement process during settlement processing rather than the standard credit or banking account settlement process.

2. The system of claim 1, wherein the first card construct is further configured to provide a customized message on the display of the client device.

3. The system of claim 1, wherein the status of the loyalty rewards account represents a change in a conversion rate.

4. The system of claim 1, wherein the change in the status of the loyalty rewards account represents a change in an account balance of the loyalty rewards account.

5. The system of claim 1, wherein the loyalty rewards account is a first account and the token further links the first account to a second account.

6. A non-transitory, computer-readable medium comprising machine-readable instructions that, when executed by a processor of a client device, cause the client device to at least:

add a loyalty rewards account as a payment medium to a digital wallet application by transmitting a token that identifies the loyalty rewards account to the digital wallet application, wherein the token includes an alias account identifier that is mapped to the loyalty rewards account, wherein the alias account identifier includes an issuing bank identifier or a loyalty reference identifier number, wherein the alias of the loyalty rewards account is associated with a funding source account, wherein the funding source account is available for settling purchases via a standard credit or banking account settlement process when the loyalty rewards account has insufficient reward points to settle a particular transaction via a loyalty settlement process;

render a first card construct within a user interface of the digital wallet application, the user interface being rendered on a display of the client device and the first card construct containing a view field that displays a status of the loyalty rewards account represented by the first card construct;

send a request to receive notifications regarding the loyalty rewards account to a computing device, the request comprising the token that identifies the loyalty rewards account;

receive a real-time notification from the computing device, the real-time notification indicating a change in the status of the loyalty rewards account;

update the view field within the first card construct rendered on the display to reflect in real-time the change in the status of the loyalty rewards account by causing the client device to at least:

display a second card construct within the user interface;

monitor boundaries of the first card construct and the second card construct to detect an overlap condition where the second card construct overlaps the first card construct such that the status of the loyalty rewards account, when rendered in a first format in the first card construct, is obscured from a view of a user;

determine the status of the loyalty rewards account would not be completely viewable if relocated to an unobstructed portion of the first card construct;

calculate a first measure of the area of the first card construct and a second measure of the area of the unobstructed portion of the first card construct;

calculate a scaling factor which is proportional to a difference between the first measure and the second measure;

scale the status of the account based upon the scaling factor;

automatically relocate the scaled status of the loyalty rewards account to an unobscured portion of the first card construct in a second format during the overlap condition so that scaled status textual information is viewable on the display by the user; and automatically return the relocated scaled status textual information to the first format within the first card construct when the overlap condition no longer exists;

receive a selection of the first card construct representing the loyalty rewards account for payment of a transaction at a checkout of a merchant that accepts mobile wallet payments; and transmit a transaction request for the transaction, wherein the transaction request includes the token that identifies the loyalty rewards account as the payment medium for the transaction, wherein the token further includes an indicator that specifies an account type for the loyalty rewards account and is configured for routing the transaction request to the loyalty settlement process during settlement processing rather than the standard credit or banking account settlement process.

7. The non-transitory, computer-readable medium of claim 6, wherein the first card construct is further configured to provide a customized message on the display of the client device.

8. The non-transitory, computer-readable medium of claim 6, wherein the change in the status of the loyalty rewards account represents a change in a conversion rate.

9. The non-transitory, computer-readable medium of claim 6, wherein the change in the status of the loyalty rewards account represents a change in an account balance of the loyalty rewards account.

10. The non-transitory, computer-readable medium of claim 6, wherein the loyalty rewards account is a first account and the token further links the first account to a second account.

11. A method, comprising:
adding, by a client device, a loyalty rewards account as a payment medium to a digital wallet application by transmitting a token that identifies the loyalty rewards account to the digital wallet application, wherein the token includes an alias account identifier that is mapped to the loyalty rewards account, wherein the alias account identifier includes an issuing bank identifier or a loyalty reference identifier number, wherein the alias of the loyalty rewards account is associated with a funding source account, wherein the funding source account is available for settling purchases via a standard credit or banking account settlement process when the loyalty rewards account has insufficient reward points to settle a particular transaction via a loyalty settlement process;

rendering, by the client device, a first card construct within a user interface of the digital wallet application, the user interface being rendered on a display of the client device and the first card construct containing a view field that displays a status of the loyalty rewards account represented by the first card construct;

sending, by the client device, a request to receive notifications regarding the loyalty rewards account to a computing device, the request comprising the token that identifies the loyalty rewards account;

receiving, by the client device, a real-time notification from the computing device, the real-time notification indicating a change in the status of the loyalty rewards account;

updating, by the client device, the view field within the first card construct rendered on the display to reflect in real-time the change in the status of the loyalty rewards account by at least:
displaying, by the client device, a second card construct within the user interface;
monitoring, by the client device, boundaries of the first card construct and the second card construct to detect an overlap condition where the second card construct overlaps the first card construct such that the status of the loyalty rewards account, when rendered in a first format in the first card construct, is obscured from a view of a user;
determining, by the client device, the status of the loyalty rewards account would not be completely viewable if relocated to an unobstructed portion of the first card construct;
calculating, by the client device, a first measure of an area of the first card construct and a second measure of the area of the unobstructed portion of the first card construct;
calculating, by the client device, a scaling factor which is proportional to a difference between the first measure and the second measure;
scaling, by the client device, the status of the loyalty rewards account based upon the scaling factor;
automatically relocating, by the client device, the scaled status of the loyalty rewards account to an unobscured portion of the first card construct in a second format during the overlap condition so that scaled status textual information is viewable on the display by the user; and
automatically returning, by the client device, the relocated scaled status textual information to the first format within the first card construct when the overlap condition no longer exists;

receiving, by the client device, a selection of the first card construct representing the loyalty rewards account for payment of a transaction at a checkout of a merchant that accepts mobile wallet payments; and transmitting, by the client device, a transaction request for the transaction, wherein the transaction request includes the token that identifies the loyalty rewards account as the payment medium for the transaction, wherein the token further includes an indicator that specifies an account type for the loyalty rewards account and is configured for routing the transaction request to the loyalty settlement process during settlement processing rather than the standard credit or banking account settlement process.

12. The method of claim 11, wherein the first card construct is further configured to provide a customized message on the display of the client device.

13. The method of claim 11, wherein the change in the status of the loyalty rewards account represents a change in a conversion rate.

14. The method of claim 11, wherein the change in the status of the loyalty rewards account represents a change in an account balance of the loyalty rewards account.

15. The method of claim 11, wherein the loyalty rewards account is a first account and the token further links the first account to a second account.

16. The system of claim 1, wherein the alias has a structure of a funding source account number.

17. The system of claim 1, wherein the machine-readable instructions, when executed by the processor of the client device, further cause the client device to request a list of accounts already present in the digital wallet and to display an add interface control that is configured to add another loyalty rewards account to the digital wallet that is not already present in the digital wallet.

18. The non-transitory, computer-readable medium of claim 6, wherein the alias has a structure of a funding source account number.

19. The method of claim 11, wherein the alias has a structure of a funding source account number.

20. The method of claim 11, further comprising routing, by an issuer server, the transaction request to the loyalty settlement process in response to the account type being a loyalty rewards account.

21. The method of claim 20, further comprising routing, by an issuer server, the transaction request to the standard bank or credit account settlement process in response to the loyalty rewards account having insufficient reward points to settle the transaction.

\* \* \* \* \*